US007281928B1

(12) United States Patent
Freeman

(10) Patent No.: US 7,281,928 B1
(45) Date of Patent: Oct. 16, 2007

(54) METHOD AND APPARATUS FOR CONDUCTING A COMPETITION USING A DIVIDED LITERARY WORK

(76) Inventor: Victoria J. Freeman, P.O. Box 9589, Norfolk, VA (US) 23505

( * ) Notice: Subject to any disclaimer, the term of this patent is extended or adjusted under 35 U.S.C. 154(b) by 830 days.

(21) Appl. No.: 09/640,369

(22) Filed: Aug. 17, 2000

(51) Int. Cl.
*G09B 19/00* (2006.01)

(52) U.S. Cl. ............... 434/156; 434/176; 434/177; 463/1; 463/9; 705/14

(58) Field of Classification Search ............ 463/1, 463/9, 40–43; 434/176–177, 307 R, 308, 434/322–323, 333, 156; 273/156, 157 R, 273/272, 299, 300, 153 R, 429–432; 705/1, 705/14, 26
See application file for complete search history.

(56) References Cited

U.S. PATENT DOCUMENTS

| 1,217,632 | A | * | 2/1917 | Pritchard ............... 273/157 R |
| 1,379,871 | A | * | 5/1921 | McGuire, Jr. ............ 273/292 |
| 1,570,906 | A | * | 1/1926 | McCord ................. 283/117 |
| 1,991,468 | A | * | 2/1935 | Schoolfield ............. 273/307 |
| 3,512,780 | A | * | 5/1970 | Allison ................. 273/139 |
| 3,964,749 | A | * | 6/1976 | Wadsworth ............ 273/157 R |
| 4,309,835 | A | * | 1/1982 | Naeve ................. 229/92.1 |
| 4,336,664 | A | * | 6/1982 | Penick et al. ............. 40/594 |
| 4,756,533 | A | * | 7/1988 | Hopkins et al. ......... 273/157 R |
| 6,200,216 | B1 | * | 3/2001 | Peppel ..................... 463/1 |
| 6,336,631 | B1 | * | 1/2002 | Volkert ................. 273/157 R |

OTHER PUBLICATIONS

'Nursery Rhymes from Mother Goose—Zelo.com', http://www.zelo.com/family/-nursery/index.asp, accessed on Oct. 21, 2003, full document.*

Selection of cards from a conventional children's game known as "Curious George Adventures Beginning Middle & End", 4 pages (front & back of card box, 6 game cards).

Selection of cards from a conventional children's game known as "Blue's Clues Story Cards", 4 pages (front & back of card box, 6 game cards).

Pictures of a toy with moveable parts (4 pages).

* cited by examiner

*Primary Examiner*—Robert E. Pezzuto
*Assistant Examiner*—Cameron Saadat

(57) ABSTRACT

The invention provides a method of advertising by conducting a competition using a literary work that is divided into a plurality of distinct parts and formed into playing pieces, each piece optionally having an associated advertisement, logo, or brand. A literary work, such as a short story, is divided into a plurality of distinct parts in such a way that the correct sequence of words in the literary work cannot be readily determined by looking at any distinct part. Each distinct part is recorded on a playing piece, such as a paper or cardboard element, and an advertisement (e.g., a corporate logo, brand, or slogan) can be recorded on the reverse side of the card. Additional "helper" playing pieces may contain information regarding the correct sequence for arranging the other cards to reassemble the literary work. The playing pieces are distributed to the public, and participants are encouraged to collect all the playing pieces pertaining to that literary work. The first participant to correctly sequence the playing pieces and send in the playing pieces (in the correct sequence) wins the competition and a corresponding prize. Playing pieces can be distributed electronically (e.g., through web sites) instead of on paper, and corporate sponsors can link playing pieces to their corporate web sites for added promotional value.

3 Claims, 8 Drawing Sheets

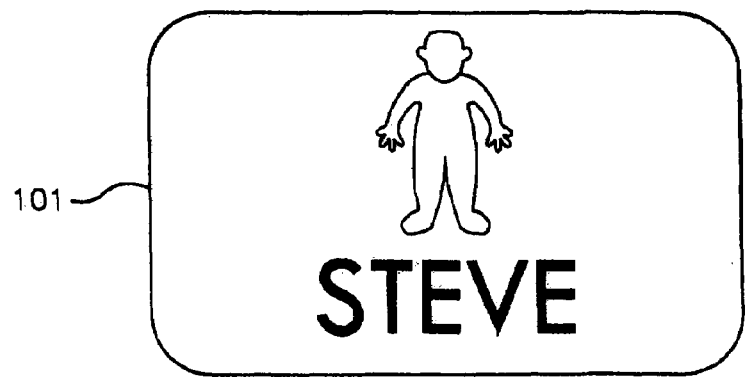
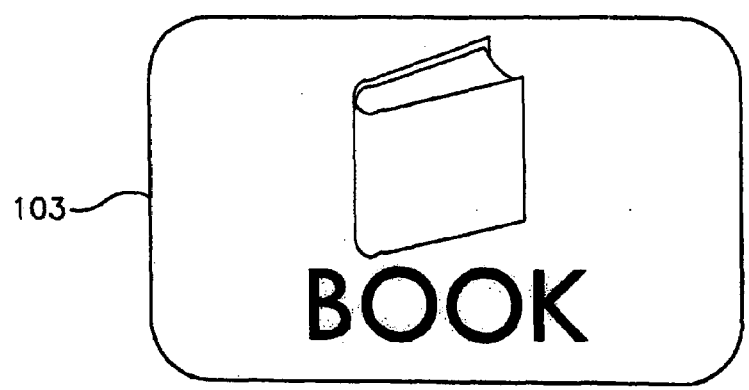
FIG. 1A
PRIOR ART

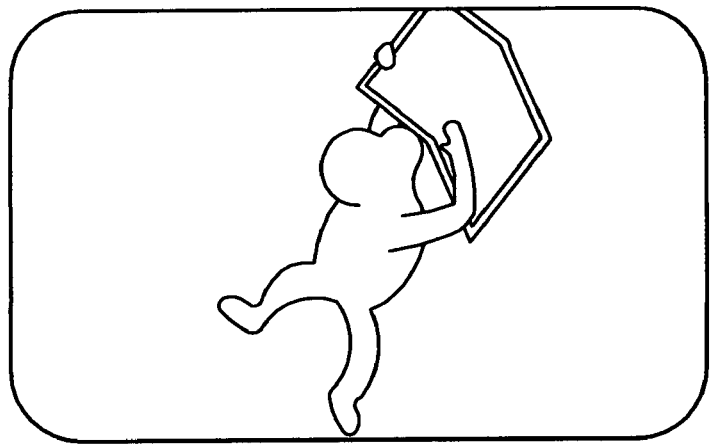
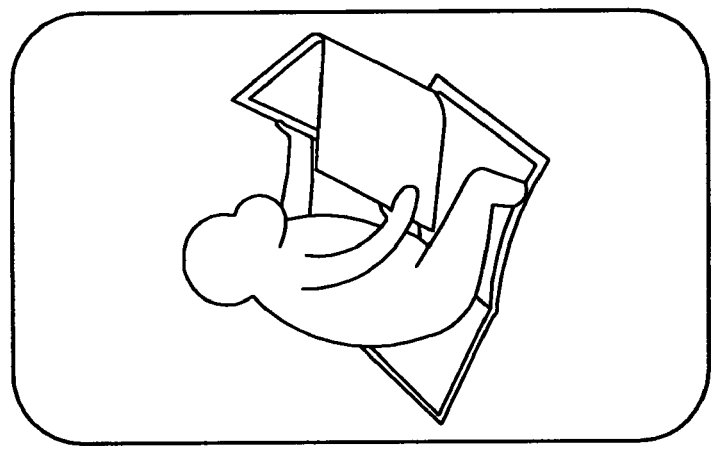
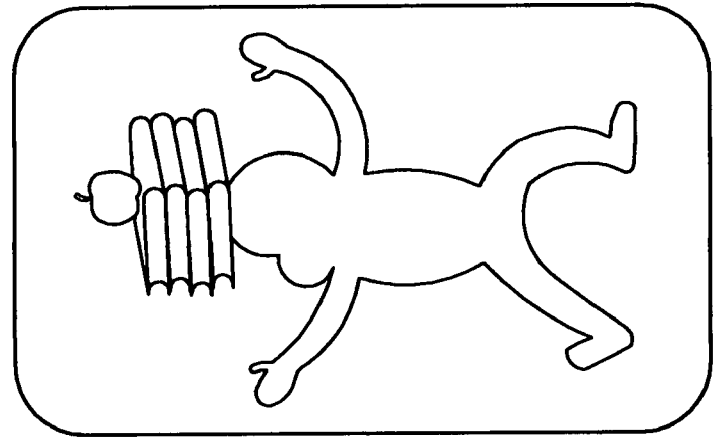
*FIG. 1B*
PRIOR ART

202 cat chased Bartholemew and Woodrow around the heart-shaped swimming pool. She slyly cornered them by the diving board and arched her back to pounce. In deperation, the little mice closed their eyes, held their noses and dove head first into the water.

The cat watched the tiny bubbles and waited. She knew they would have to come up for air or they would drown. After a minute had passed, both Bartholemew and Woodrow shot up to the surface, gasping for breath.

"Tread water," Tobias shouted at them.

27

212

203

Once upon a time there was a boy named Tobias. He lived in a big house with his mommy, his daddy, and his younger brother Tyler. Every day Tobias and Tyler would play a game of hide and seek.

One day while Tobias was searching for his brother, he discovered a mouse hole on the west wall of the dining room. Tobias put his hand inside the hole and felt around in the dark cold space. Then he tried to pull out his hand, but it would not budge. Tobias's hand was stuck. The more he tried to pull it out, the more stuck his hand became

32

213

204 and they ran up the stairs to the second floor. The burglars spotted them and gave chase.

"Let's hide in here." one of them said. Quickly, Tobias and Tyler, Bartholemew and Woodrow ducked into the playroom and shut the door.

"Move the chair over," Woodrow ordered in his best John Wayne voice. "We'll use it to barricade the door."

"I can't. It's too heavy" Bartholemew whispered, holding one hand against the chair and the other against his aching back.

6

214

205 inside the mouse hole.

"Help!" Tobias cried out. But he knew that nobody could hear him. His Mom and Dad were out in the yard tending their garden and Tyler was still hiding in his secret place.

What am I going to do? How am I ever going to free my hand?" Tobias wondered outload.

"I'll help you boy. My name is Bartholemew Mouse and your hand is blocking the entrance to my house."
Tobias could not believe his ears. He looked all around to see where the tiny voice was coming

METHOD AND APPARATUS FOR CONDUCTING A COMPETITION USING A DIVIDED LITERARY WORK

BACKGROUND OF THE INVENTION

1. Technical Field

This invention relates generally to advertising and promotions, and more particularly to a method for advertising by conducting a competition using all or a portion of a literary work that is divided into a plurality of distinct parts and formed into playing pieces that can include an advertisement, logo, or brand.

2. Related Information

Businesses and organizations frequently invest in advertising and promotion to encourage potential customers to purchase their goods or services. Companies use various techniques such as advertisements, sweepstakes, contests, and the like to promote their brand name and products. Fast food restaurants, for example, sometimes affix game items to food containers and encourage customers to collect game items in exchange for prizes, such as free food. Other companies encourage customers to purchase goods or services by offering a chance to win a predetermined prize, such as a luxury car or a vacation.

There has been a trend in recent years to promote literacy among children through various techniques. Children are encouraged to read books and other materials in order to become literate. Various games have been developed to facilitate this purpose. As one example, a game known as "Blue's Clues Cards"™ includes a fixed deck of cards with pictures and words. The object of the game is for a child to arrange several cards in any order to create a story.

As shown in FIG. 1A, three cards 101, 102, and 103 can be arranged in a certain order to make a short sentence (e.g., "Steve Reads Book."). Longer sentences can be created by using more cards. Each card includes a picture and a corresponding word on one side, and a word but no picture on the other side, such that both sides of the cards can be used to form a sentence of the child's choosing. In effect, each child becomes an author since each child can create a different sentence.

A different game, sold as "Curious George Adventures,"™ contains sets of three cards depicting illustrations without words relating to a certain event (e.g., a monkey picking up a book and reading it). FIG. 1B shows three sample cards from the game. The object of the game is for the child to identify the correct sequence of the depicted illustrations based on information on each picture card, such as borders, actions choreographed on the cards, and the like. The back of every card is identical and identifies the name of the game and the company that produces the cards.

Steven King, the famous novelist, has recently announced his intention to write a book and post it to the Internet in stages, such that successive stages would only be distributed if he receives payment from readers for the previous stages of the book. This concept may revolutionize the way that literary works are distributed to the public.

The need for companies to find new and interesting ways of promoting their products and services presents an opportunity to promote literacy and reading among children and, consequently, leads to the principles of the present invention.

SUMMARY OF THE INVENTION

The present invention provides a method and apparatus for advertising while promoting literacy and reading among children. A literary work, such as a short story, is divided into a plurality of distinct parts, each of which has no readily apparent relation to the other parts. Each distinct part is formed into a playing piece, such as a card, and can be associated with an advertisement. Additional "helper" playing pieces can contain information regarding the correct sequencing of one or more playing pieces.

The playing pieces for a literary work are distributed to the public, and participants are encouraged to collect all the pieces pertaining to that literary work. The first participant to correctly sequence the playing pieces of the literary work and send them or show them (in the correct sequence) to the competition promoter wins the competition and a corresponding prize. Playing pieces can be distributed in physical form (e.g., cards), or electronically (e.g., through web sites), and competition sponsors can link playing pieces to their web sites for added promotional value. The invention provides a fun and rewarding competition that has the added benefit of promoting a literary work, encouraging reading, and using advertising to subsidize the competition.

Other features and advantages of the invention will become apparent with reference to the following detailed description and the figures.

BRIEF DESCRIPTION OF THE DRAWINGS

FIG. 1A shows cards from a conventional children's game known as "Blue's Clues Story Cards."™

FIG. 1B shows cards from a conventional children's game known as "Curious George Adventures."™

FIG. 3 shows four playing pieces each containing a divided distinct part of a literary work according to one variation of the invention.

DETAILED DESCRIPTION OF THE PREFERRED EMBODIMENTS

As described above, a literary work (including, for example, a children's story or book; an adult fictional work; a poem; a song lyric; a joke; an essay, etc.) is divided into a plurality of distinct parts that can begin and end at arbitrary points in that literary work. For the purposes of this invention, a literary work does not include a slogan, title, trademark or service mark, a single word or sentence, a phrase, or the like. At a minimum, a literary work must comprise at least 100 words or more and constitute an original work of authorship.

The literary work can be divided into the plurality of parts manually, or by computer (e.g., by allocating a certain number of words to each part). The literary work can include illustrations, but at a minimum must include a plurality of words that, when divided into distinct parts, can be reassembled into their correct sequential order. Distinct parts can also be created using sounds (e.g., words that are converted into audible form and stored in a recording device or computer). Each distinct part is formed into a playing piece and can be associated with an advertisement (e.g., a corporate name, a product name, a slogan, logo, icon, web site address, sound, description or illustration of product or service, or other promotional device). Some or all of the playing pieces may not include advertisements, but could instead be distributed in conjunction with an advertising campaign. As one example, a competition sponsor might distribute playing pieces from its stores or by mail, with the advertising implicit in the distribution from the sponsor.

Figure 2:
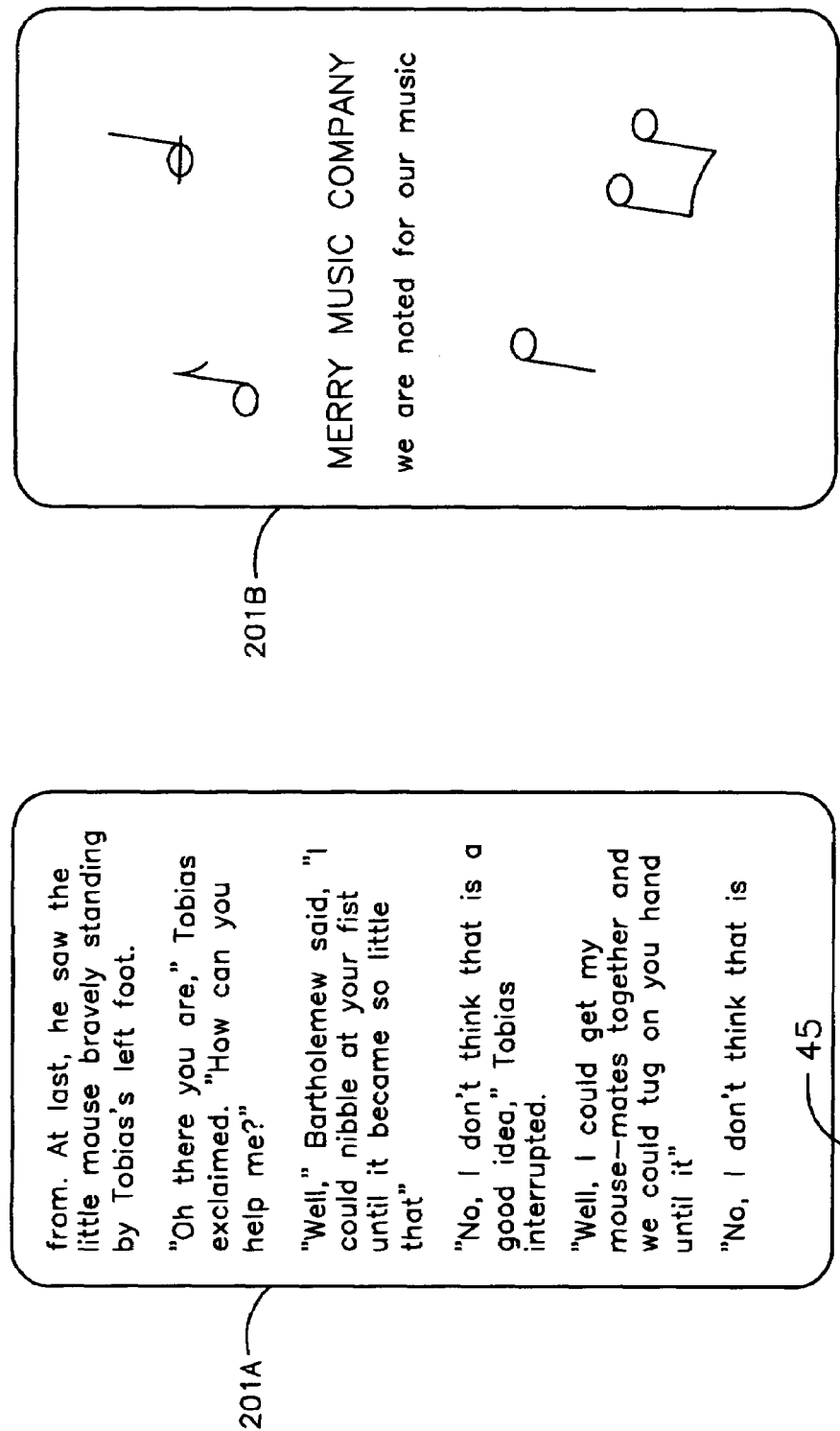
FIG. 2 shows the front and back of a playing piece comprising a divided distinct part of a literary work on one side and an advertisement on the other side according to one variation of the invention.

FIG. 2 shows a playing piece comprising a distinct part of a literary work on one side 201A and an advertisement on the other side 201B according to one variation of the invention. All playing pieces can include an advertisement for the same company, but in one variation of the invention a plurality of businesses or organizations sponsor the competition such that a plurality of different advertisements are created for the literary work. Although the advertisement is illustrated as being on the reverse side of the playing piece, it will be appreciated that both the advertisement and the distinct part of the literary work can be incorporated on the same side of the playing piece.

It is also preferred that the advertisement bear no apparent relationship to the literary work. For example, a restaurant chain might sponsor a children's book; a scholarship fund might sponsor an adolescent's book; and so forth. However, the invention is not limited in this respect. For example, a publisher that promotes a particular literary work could advertise the publisher's logo, web site address, or the name of a bookstore from which the literary work can be purchased. A unique piece identifier 211 can be used to identify each playing piece but, typically, not its sequence (e.g., the unique piece identifier does not correspond to a page or chapter number). Because part of the competition is intended to involve skill on the part of each participant, participants are expected to collect additional playing pieces (including helper pieces, discussed below) and try to discern the correct sequence of the pieces by reading and understanding the contents of the playing pieces.

FIG. 3 shows four additional playing pieces representing four distinct parts of the same literary work (elements 202 through 205). Each playing piece includes a piece identifier (212 through 215). As can be seen from the illustrative examples, the playing pieces each include a distinct part of the same literary work that contain a number of words, but which cannot be readily correlated with other playing pieces without reading the distinct part of the literary work on each playing piece.

Figure 4:
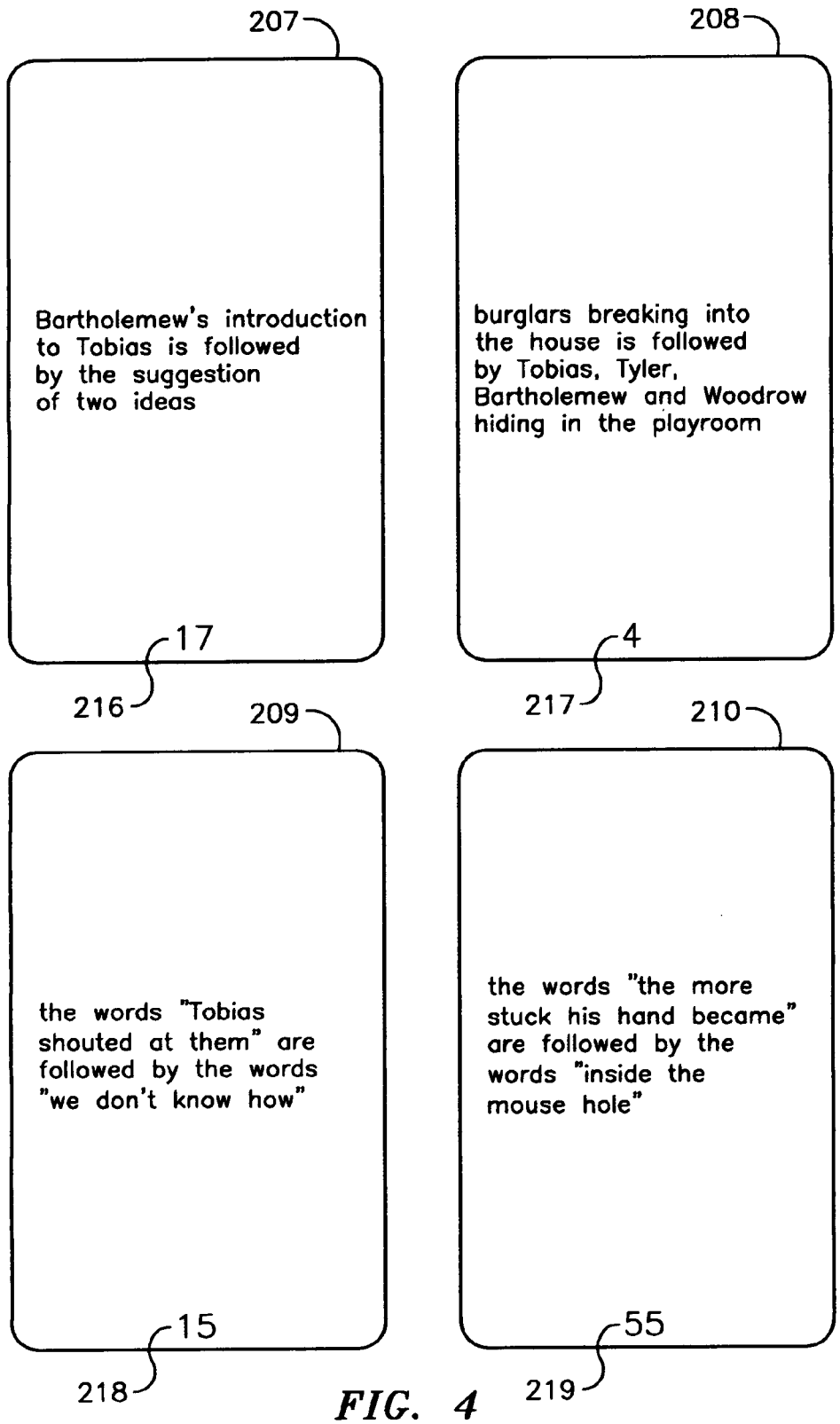
FIG. 4 shows four "helper" cards each containing information regarding the correct sequence of certain playing pieces.

FIG. 4 shows four "helper" playing pieces that can also be distributed in conjunction with the playing pieces containing the distinct parts of the literary work. As seen in FIG. 4, helper pieces 207 and 208 provide information that requires comprehension of distinct parts of the literary work, while helper pieces 209 and 210 directly provide information linking specific words in one playing piece to words in another playing piece. Other variations of helpful information are of course possible.

Figure 5:
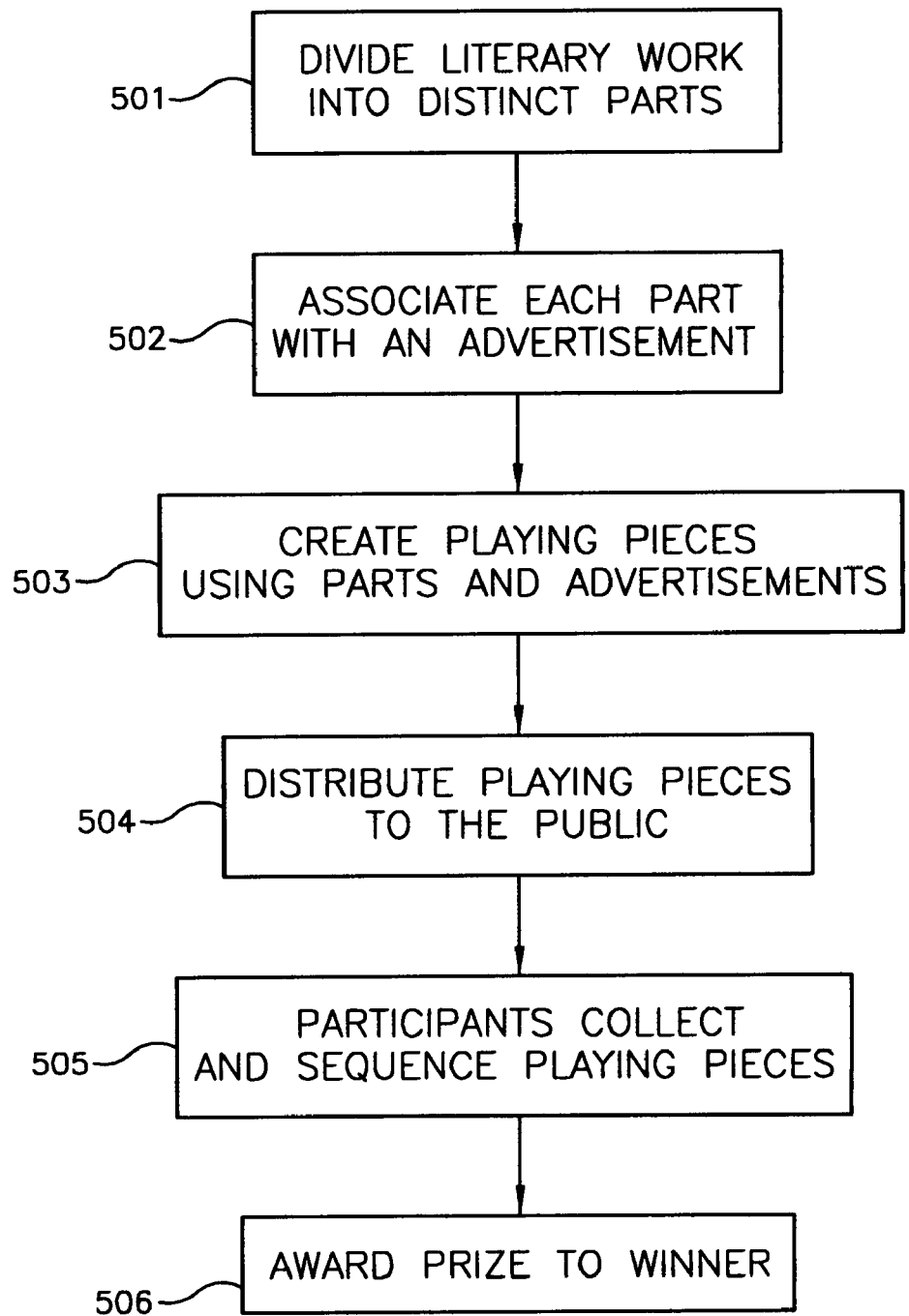
FIG. 5 shows a process for carrying out the principles of the invention.

FIG. 5 shows a generalized process according to one variation of the invention. Beginning in step 501, a literary work is divided into a plurality of distinct parts. In step 502, each part is associated with an advertisement, such as a corporate sponsor for the competition. In step 503, playing pieces are created using a distinct part of the literary work and an advertisement. As described in more detail below, playing pieces can comprise physical objects (e.g., cards, plastic tablets, and the like), or an intangible object (e.g., a computer-generated display on a web page). Combinations of the two are also possible, such that some playing pieces are distributed in the form of physical objects, while other playing pieces are distributed over the Internet (e.g., displayed on the web sites of sponsors). In yet another embodiment of the invention, playing pieces can include a web site address inviting participants to visit a web site, and the corresponding playing pieces are displayed on the web site, preferably in conjunction with advertisements.

In step 504, the playing pieces are distributed to the public. This step can be performed in various ways, including (1) handing out playing pieces at restaurants, retail stores, schools, or other physical locations; (2) mailing playing pieces to participants; (3) e-mailing playing pieces to Internet addresses of participants; (4) displaying playing pieces at sponsor web sites, typically after "clicking through" an advertisement or invitation; (5) displaying playing pieces at a central location (e.g., a web site run by the competition promoter); (6) affixing playing pieces to objects such as books, cans, or food items; or (7) any combination of the above.

In one variation of the invention, the playing pieces are not all distributed simultaneously, but are instead distributed in a staggered manner, such that participants must play over a longer time period before a winning sequence of playing pieces can be obtained. Participants can trade playing pieces in an attempt to collect all the pieces necessary to win the competition. The number of playing pieces can be announced at the outset of the competition, or the total number of playing pieces can be made the subject of various hints and part of the skill required to win the competition.

In step 505, participants are invited to collect and correctly sequence the playing pieces, and to send (e.g., by mail or e-mail) the collected playing pieces in the correct sequence to the competition headquarters. In one variation, only the playing pieces containing the distinct parts of the literary work are sent in, while in another variation, all of the playing pieces (including the helper pieces) are collected and sent in. In step 506, the first participant to send in the correctly sequenced playing pieces wins a prize, such as books, cash, scholarships, computers, trips, awards, recognition, or the like. When playing pieces are received at the competition headquarters, it can be readily determined whether a given set of playing pieces was assembled in the correct order by looking at the unique piece identifier on each card. Although these numbers will typically not be in numerical order, they will be in a predetermined order that is known at the time the literary work is divided into distinct parts and formed into playing pieces.

Figure 6:
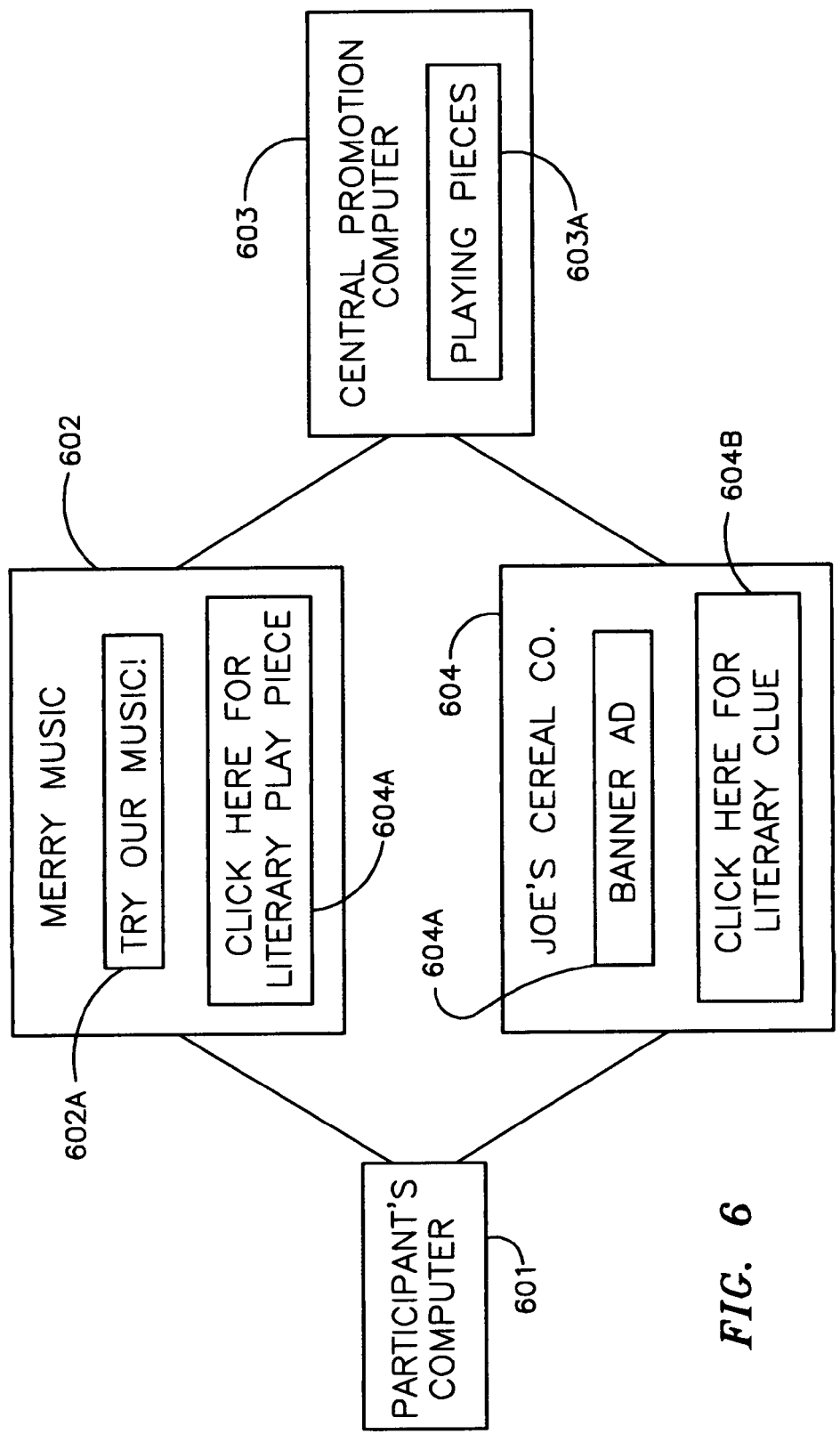
FIG. 6 shows a computer system for carrying out the principles of the invention.
Figure 7:
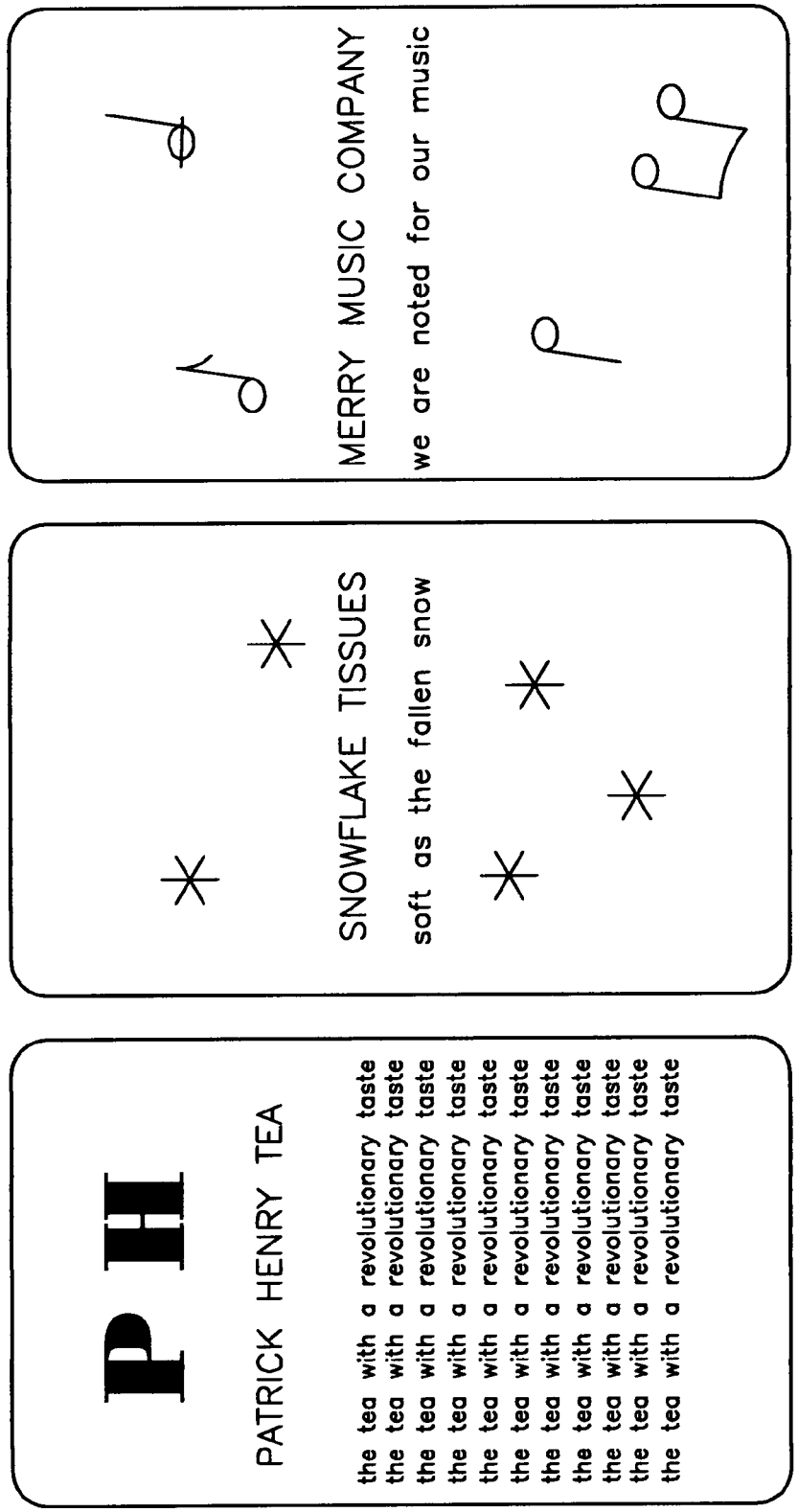
FIG. 7 shows examples of sponsor advertisements on playing pieces according to one variation of the invention.

FIG. 6 shows a system including computers linked via a network (e.g., the Internet) by which the inventive principles can be practiced. It is assumed that the computers shown in FIG. 6 are linked using well-known Internet protocols to transmit and receive information and display web pages using well-known web browser technology. A participant's computer 601 can be linked to any of the computers shown in FIG. 6 using a web browser.

A central promotion computer 603 includes a database of playing pieces 603A that are to be distributed to one or more sponsor computers 602 and 604. Alternatively or additionally, the playing pieces can be viewed directly from central computer 603 or e-mailed to participants. Computer software in central computer 603 transmits one or more playing pieces to sponsor computers 602 and 604. In one variation of the invention, sponsors must pay for playing pieces or other aspects of the competition in exchange for sponsorship. Sponsor computer 602 displays a web page which may include an advertisement 602A inviting a participant to sample the sponsor's products or services. Computer 602 also displays an icon 602B that invites the participant to view or download a playing piece of the type described above. Once the participant downloads or views the playing piece, he or she can print it on a printer and mail it (along with other playing pieces in the correct sequence) to the competition headquarters in satisfaction of the competition rules.

In one variation, playing pieces are intermittently displayed on a sponsor's web site or a central web site (e.g., they are not always present), thus requiring participants to frequently visit the web site in an attempt to obtain the playing pieces during the time that they are displayed. For example, participants may be required to click on a company's logo or advertisement or answer a question about the company's products or an unrelated topic before a playing piece is provided.

Sponsor computer 604 also displays a web page including a different advertisement 604A and an icon 604B that invites the participant to view or download a different playing piece. In general, the participant can surf the Internet looking for playing pieces, or can visit the web sites of sponsors or other web sites (including the central computer web site) in an attempt to obtain playing pieces. Moreover, playing pieces can be linked to each other through different web sites, such that one sponsor's web site refers to another sponsor's web site, and the participant has an incentive to visit multiple sponsor web sites in an attempt to obtain additional playing pieces. Each sponsor's web site can also be linked to the central computer, such that participants can quickly move between sites. Central computer 603 can also display rules and other information regarding the competition.

Thus has been described a system and method for conducting a competition using playing pieces that encourage participants to read all or a portion of a literary work. The principles of the invention can be practiced in ways other than those specifically described herein. Reference numerals in the appended method claims identifying steps are for convenience only and are not intended to imply a necessary ordering of the steps. It is, therefore, to be understood that within the scope of the appended claims the invention may be practiced otherwise than as specifically described. No claim should be interpreted to be in means-plus-function format.

The invention claimed is:

1. A method for promoting literacy and reading by conducting a competition related to a literary work in association with an advertisement, comprising:

dividing a literary work comprising a correctly ordered sequence of words into a plurality of distinct parts, each part having no readily identifiable means for determining the correct sequence of words in said literary work;

creating a plurality of playing pieces, each of said playing pieces comprising one of said distinct parts;

creating an advertisement;

distributing said plurality of playing pieces comprising one of said distinct parts to members of the public in association with said advertisement;

collecting said playing pieces comprising one of said distinct parts;

sequencing said playing pieces into a correctly ordered sequence of words in said literary work;

sending said correctly ordered set of playing pieces, or an identifier thereof, that represents the correctly ordered sequence of words in said literary work; and winning a prize for said correctly ordered set of playing pieces that represents the correctly ordered sequence of words in said literary work.

2. The method of claim 1 wherein said advertisement is a corporate name.

3. The method of claim 1 wherein said advertisement is an advertising campaign.

* * * * *